US008496513B2

(12) United States Patent
Van Esbroeck et al.

(10) Patent No.: US 8,496,513 B2
(45) Date of Patent: Jul. 30, 2013

(54) DEVICE AND METHOD FOR SCALDING DIFFERENT PARTS OF A POULTRY CARCASS WITH VARYING INTENSITIES

(75) Inventors: Maurice Eduardus Theodorus Van Esbroeck, Bemmel (NL); Marco Johan Halfman, Zeddam (NL); Erik Jan Van De Griend, Oss (NL); Adrianus Josephus Van Den Nieuwelaar, Gemert (NL)

(73) Assignee: Marel Stork Poultry Processing B.V., Boxmeer (NL)

( * ) Notice: Subject to any disclaimer, the term of this patent is extended or adjusted under 35 U.S.C. 154(b) by 181 days.

(21) Appl. No.: 13/130,635

(22) PCT Filed: Nov. 25, 2009

(86) PCT No.: PCT/NL2009/050714
§ 371 (c)(1),
(2), (4) Date: Aug. 4, 2011

(87) PCT Pub. No.: WO2010/062173
PCT Pub. Date: Jun. 3, 2010

(65) Prior Publication Data
US 2011/0287703 A1    Nov. 24, 2011

(30) Foreign Application Priority Data
Nov. 25, 2008    (NL) .................................. 2002250

(51) Int. Cl.
*A22B 5/08*    (2006.01)

(52) U.S. Cl.
USPC .............................................. 452/74

(58) Field of Classification Search
USPC ........................................ 452/74, 76, 77, 173
See application file for complete search history.

(56) References Cited

U.S. PATENT DOCUMENTS

| 3,670,365 | A | | 6/1972 | Dillon | |
|---|---|---|---|---|---|
| 5,605,503 | A | * | 2/1997 | Martin | 452/173 |
| 5,938,519 | A | * | 8/1999 | Wright | 452/173 |
| 6,918,825 | B2 | * | 7/2005 | Conaway | 452/88 |
| 7,189,157 | B2 | * | 3/2007 | Wichelmann | 452/77 |
| 7,648,412 | B2 | * | 1/2010 | Kjeldsen | 452/88 |
| 8,066,556 | B2 | * | 11/2011 | Kjeldsen et al. | 452/76 |
| 8,246,429 | B2 | * | 8/2012 | Hilgren et al. | 452/173 |

FOREIGN PATENT DOCUMENTS
WO    2008013447  A1    1/2008

* cited by examiner

*Primary Examiner* — Richard Price, Jr.
(74) *Attorney, Agent, or Firm* — The Webb Law Firm, P.C.

(57) ABSTRACT

The present invention relates to a device for scalding poultry carcasses comprising a plumage, comprising: a processing space with transport means in the form of a transport path for poultry carcasses; a feed of scalding medium; dispensing means for the scalding medium provided with outlet openings, wherein the scalding medium leaving the outlet openings co-displaces with the poultry carcasses moving along the transport path. The present invention also relates to an improved method for scalding poultry.

16 Claims, 8 Drawing Sheets

DEVICE AND METHOD FOR SCALDING DIFFERENT PARTS OF A POULTRY CARCASS WITH VARYING INTENSITIES

BACKGROUND OF THE INVENTION

1) Field of the Invention

The present invention relates to a device for scalding poultry carcasses comprising a plumage, comprising: a processing space provided with transport means which define a transport path for the poultry carcasses leading through the processing space; a feed of scalding medium; and dispensing means for the scalding medium connecting the feed of scalding medium to the processing space and provided with a plurality of outlet openings which are directed toward the transport path and with which the scalding medium is carried into the transport path. The present invention also relates to an improved method for scalding poultry.

2) Description of the Prior Art

The scalding of poultry, and more particularly slaughtered and bled poultry such as chickens, ducks and turkeys, has the purpose of reducing the attachment of the feathers to the carcass, such that removal of the plumage during a subsequent (plucking) process becomes simpler. A prerequisite for scalding is that scalding must be completed shortly after poultry has been slaughtered because of the rapid onset of rigor mortis. Partially because of the desired speed use has heretofore usually been made of a basin with warm water in which the poultry is immersed. After a treatment time of about 3 minutes the poultry is taken out of the basin and the feathers can be removed relatively easily. A drawback of this so-called "immersion scalding" is that the poultry entrains a considerable amount of water from the basin, and there is also the problem of possible transfer of dirt, germs and bacteria from the basin.

An alternative method of scalding is described in WO 2008/013447 of the present applicant. A device and a method are described herein for scalding poultry comprising a full plumage. A scalding medium with a dew point lying in a specific range is composed here in a conditioning space, and carried therefrom to a processing space using dispensing means with at least one outlet opening. This processing space is provided with transport means defining a transport path for the poultry leading through the processing space. In the processing space liquid condenses from the scalding medium onto the poultry, whereby a relatively great heat transfer can be realized in a short time. Although this method and device already provide a number of clear advantages, such as a relatively advantageous scalding result which can be realized in a short period of time, it has been found desirable in practice to control the scalding result even better than is possible with the described method. A primary quality criterion is of course the extent to which the feathers are loosened. Other factors determining the quality of scalding are the degree of damage to the epidermis (surface epithelium/dermis) and the degree of denaturation ("boiling down") of proteins in the meat directly under the skin. At least all these aspects must be taken into account in quality control of the scalding process.

It is the object of the invention to provide an improved method of scalding and the means required for this purpose, whereby a readily controllable scalding result can be obtained while retaining the advantages of the prior art.

SUMMARY OF THE INVENTION

The present invention provides for this purpose a device for scalding poultry carcasses having plumage, wherein a dispensing means can be controlled such that a scalding medium leaving outlet openings co-displaces with the poultry carcasses moving along a transport path. In a particular embodiment variant the dispensing means comprise for this purpose at least one displaceable outlet opening which is carried by a dispensing conveyor, which dispensing conveyor is movable along a dispensing path, wherein the dispensing path lies at a fixed distance from the transport path over at least a part of the transport path for the poultry carcasses followed by the transport means. More or less scalding will thus occur in targeted manner at the position where the jet of scalding medium strikes the skin of the poultry carcasses. The important advantage of condensation in general is that it allows a very considerable heat transfer in a relatively short time, wherein the risk of (local or other) overheating ("overscalding") of the poultry carcasses is controllable. Damage to the epidermis as a result of the scalding can vary and can be classified as "low scald", "intermediate scald" or "high scald", and the degree of "denaturation" of the poultry meat will vary depending on the degree of scalding. Excess damage to the epidermis (surface epithelium) of the slaughtered animals must of course be prevented. When scalding medium is fed it will desirably condense onto the skin of the poultry carcass, whereby a relatively great heat transfer is realized as a result of the condensation while the temperature of the poultry will not exceed the wet bulb temperature, at least as long as the skin has not dried up as a result of evaporation or as long as the liquid on the skin is not heated any further.

The properties of the attachment of the feathers of different parts of a poultry carcass and the requirements set for the different parts of a poultry carcass during the further processing can vary considerably in practice. There are thus parts for which a certain degree of "overscalding" is acceptable because the skin is for instance removed from these parts (envisage for instance breast meat), while other carcass parts must on the other hand exhibit no traces of "overscalding". Conversely, there are also clear differences in the degree of attachment of the feathers to different carcass parts. Examples hereof are the relatively firm attachment of the feathers at the position of the legs, the neck, the wings, the belly and/or the tail. The present invention now makes it possible to vary the degree of scalding of different carcass parts of one and the same carcass in highly controllable manner without it being possible to only scald a carcass with a single intensity at a determined position, as has been possible according to the prior art. Depending on the wishes during the further processing of a poultry carcass, it is thus possible to opt to scald the plumage to greater and lesser extent at different positions.

Dispensing means are very generally understood to mean supply means intended for targeted supply of the scalding medium; the dispensing means may optionally be provided with control means if desired. The scalding medium can be blown at least partially underneath the feathers. To this end the jet (or jets) of scalding medium will in particular have to be brought into contact with the poultry in a manner aimed against the direction of implant of the feathers; the scalding medium will thus penetrate the feathers and at least partially reach the skin.

In respect of the scalding medium that can be applied, heated air is in the first instance envisaged which has a dew point in the range of [49-68]° C. and which is at least partially or almost fully saturated with water. Other scalding media can however also be applied. It is for instance the case for the liquid that alternative liquids or liquid mixtures can be applied instead of water. The device according to the present invention is not limited in respect of a specific scalding medium. The range of [49-61]° C. here forms a more traditional range of the temperature of the scalding medium, although the present invention also enables scalding for a limited period of time and locally (partially) at higher temperatures, without this having to result in overscalding. The (temporary) scalding at temperatures in the range of [61-68]° C. not only has the advantage that, due to the extra intensive scalding, parts of the plumage that are more difficult to remove become more easily releasable, but a higher temperature also has the advantage that more microbes are in this way better rendered harmless. For microbiological reasons it is therefore also advantageous to (partially) scald temporarily at a higher temperature of [61-68]° C.

The dispensing means for carrying the scalding medium into the transport path are preferably provided with at least one adjustable outlet opening. Using such an adjustable outlet opening it is possible to select the optimal direction and form of the jet of scalding medium. The form, starting position, length and direction of the jet of scalding medium can be modified subject to situational conditions. Another advantage is the efficient energy use which can be realized as a result of the present invention. Carcass parts which require less intensive scalding can now after all be treated less intensively than carcass parts which require a higher degree of scalding. This results in a targeted use of the scalding medium and thus prevents excess use of scalding medium, and thus excess energy consumption.

The transport path is usually formed by an overhead conveyor which is provided with poultry holders displaceable along the overhead conveyor. The poultry can be suspended by the legs from the poultry holders and thus pass through a transport path defined by the overhead conveyor, and is thus readily accessible for the feed of scalding medium. In order to displace the scalding medium to the processing space the device can be provided with at least one fan, also referred to as blower or ventilator. It is further desirable that the processing space be provided with discharge means for discharging from the processing space condensation and/or gas/liquid mixture which is not (any longer) correctly conditioned.

In another preferred variant the dispensing means are provided with valves which can be controlled such that the outlet openings directed toward the transport path can be opened and closed as desired. The feed of scalding medium can be turned on and off by controlled opening and closing of the outlet openings, whereby the scalding medium can be directed at the poultry carcasses subject to the movement of the carcasses. Successive jets of scalding medium are thus blown onto an individual poultry carcass, and a virtually co-displacing jet is thus created, which is however made up of a plurality of separately controlled, successive individual jets. The advantages as already described above in respect of the at least one outlet opening displaceable by a dispensing conveyor can also be obtained in this manner. A combination of measures can of course also be envisaged; i.e. a scalding device provided with an outlet opening displaceable by a dispensing conveyor and outlet openings which are directed toward the transport path and which can be closed and opened in controlled manner.

In yet another embodiment variant the dispensing means are adapted such that the resistance of the feed of scalding medium to the individual outlet openings can be controlled per outlet opening. This can for instance be realized by incorporating in connecting conduits restrictions with a known flow resistance. It is optionally possible to give such restrictions (resistances) an adjustable form such that the throughflow becomes controllable. With this measure the mutual ratio of the flow rate of different outlet openings can be adjusted and a controlled distribution of the supply of scalding medium over a plurality of outlet openings can be obtained (flow control), this resulting in a further improvement in the controllability of the scalding process.

In another preferred variant the drive of the transport means defining the transport path is synchronized with the drive of the dispensing conveyor such that a dispensing conveyor can be co-displaced in synchronized manner with a poultry carcass. An outlet opening (or a plurality of outlet openings) can thus be held accurately in a fixed orientation relative to a carcass part for some time, i.e. while passing through the dispensing path, such that the relevant carcass part can be treated (scalded) in targeted manner. As a result of the synchronization of the transport means and the drive of the dispensing conveyor undesired differences in speed are prevented. This can be realized advantageously (with only a single drive) and accurately if the drive of the transport means defining the transport path also forms the drive of the dispensing conveyor. This means that the two systems are coupled.

In an advantageous embodiment variant of the device according to the invention the dispensing conveyor is connected to a reversing wheel which forms part of the transport means for the poultry carcasses. When passing through a bend, wherein the transport means are guided by a reversing wheel, it is thus possible to realize in very simple manner that the displaceable outlet opening carried by the dispensing conveyor is situated at a fixed position while the carcass passes through the bend. Nor is individual driving of the dispensing conveyor necessary; it is after all directly coupled to the reversing wheel.

In another embodiment variant it is possible to embody the dispensing conveyor in the form of an endless conveyor, a part of which is parallel to the transport path for the poultry carcasses. It is for instance possible here to envisage a belt conveyor or a chain conveyor. Such a dispensing conveyor has the advantage that it is possible to realize a dispensing path of any desired length and any desired form. This provides great freedom in respect of the process conditions which can be created with the device. It is also possible to give the feed of scalding medium a multiple form such that different outlet openings of the dispensing means can be fed with different scalding media. It is thus not only possible to vary the location at which a carcass is scalded, but other process conditions can thus also be chosen as desired. Here can be envisaged for instance differing process conditions such as degree of saturation, temperature, dew point, composition of the scalding medium, speed and flow rate. Even further variation of local process conditions can be obtained if the dispensing means are embodied such that the speed at which the scalding medium is carried out of the different outlet openings differs. This can be realized for instance by applying a plurality of ventilators/blowers, or by varying the resistance with which the scalding medium is carried to different outlet openings. Another possibility for obtaining a variation in outflowing scalding medium over a plurality of outlet openings is by producing mutually differing scalding media or by having a prepared scalding medium for some of the outlet openings undergo a further treatment (for instance additional heating, changing the degree of saturation and so on). Differing process conditions can thus also be created by different outflow openings. This can be taken even further by subdividing the processing spaces, optionally by arranging physical divisions or by location in the space (for instance high/low) in a plurality of compartments/chambers in which differing process conditions are created. A first scalding chamber can for instance thus be created in which heat is transferred in less precise manner to the poultry and possible products carriers (for instance a space at a relatively high temperature) in combination with a subsequent processing space in which the process conditions are maintained precisely at a determined level (for instance at a well controlled, relatively lower temperature so as to prevent local overheating of the carcasses that have already been brought to temperature).

In another particular embodiment variant it is desirable that the relative position of the dispensing conveyor and the displaceable outlet opening carried thereby is adjustable. The device can thus be adapted to treat different types of poultry, for different batches of the same poultry animal, or even for individual scalding per slaughtered animal. For adjustment of the outlet opening(s) at individual level, and optionally also in the case of adjustment per different group of slaughtered animals, it can be advantageous to automate the displacement of the outlet opening, for instance by incorporating at least one sensor (a camera system can particularly be envisaged here) and a drive coupled to the sensor and a control system for displacing the outlet opening(s) at the command of the control system.

For a good accessibility and in order to standardize the accessibility, it is desirable for the dispensing conveyor to also carry movable positioning means for positioning carcass parts of poultry carcasses carried by the transport means. With the same object the device can also be provided with positioning means disposed in stationary manner in the processing space.

For the purpose of composing the scalding medium it is desirable for the feed of scalding medium to comprise a conditioning space. A scalding medium can thus be composed in the conditioning space with a dew point lying in the range of [49-68]° C., or in an even smaller range. In addition to the range of [49-61]° C. (temporary) and partial scalding can now also take place with the present method at higher temperatures of [61-68]° C. For the advantages of this higher temperature range reference is made to the advantages thereof already stated above.

In addition to the dispensing means co-displaced with the poultry carcasses over a dispensing path, the device can also comprise dispensing means which are arranged in stationary manner. A minimum scalding level can for instance thus be determined for the whole carcass and/or a determined scalding level can be realized at a determined position of the poultry carcass.

It is also desirable to provide the device with at least one sensor and an intelligent control communicating with the sensor. Scalding can thus be further automated. For instance by automatic control, subject to the detected carcass variables, of the positioning of one or more outlet openings, the composition of the scalding medium (time, quality and/or volume), the supply of heated liquid (time, quality and/or volume), the transport speed of the poultry, the driving of the fan and so on. It is also possible to detect external quantities influencing the scalding process and to utilize these in the intelligent control of the scalding process. Possible external influences which can be important in controlling the scalding conditions are for instance: the air humidity, ambient temperature, the presence of poultry carcasses in the feed, the temperature and/or the volume of the supplied poultry carcasses. A plurality of sensors can of course also supply information to the intelligent control. A result of collecting more information is that not only can the process conditions be better controlled, but that this may also result in energy-saving. If it is for instance detected that fewer (or even no) poultry carcasses are being supplied during a determined period of time, the feed of scalding medium can be reduced or even temporarily stopped.

The invention also provides a device for scalding poultry carcasses having plumage, wherein the poultry carcasses are at least partially shielded by a cover member co-displacing with the poultry carcasses over at least a part of the transport path. Vulnerable carcass parts or carcass parts requiring less intensive scalding for the purpose of further processing can thus be subjected to a reduced scalding action locally. In order to facilitate a good fit of the cover members to the poultry carcasses it is desirable that the device be provided with a plurality of cover members, wherein each cover member is adapted to shield in each case a part of only a single poultry carcass. The advantages as already described above in respect of the co-displacing outlet openings can be realized by means of such a device. This variant can be seen as a kinematic reversal of the embodiment variant with the co-displacing outlet openings. It is also noted in this respect that it is also possible to envisage the co-displacing outlet openings being utilized for local protection against excess scalding by allowing a less intensively acting scalding medium to exit the co-displacing outlet openings, or co-displacing outlet openings even being utilized to cool carcass parts locally.

The present invention also relates to a method for scalding poultry carcasses comprising a plumage, comprising the processing steps of: A) displacing the poultry carcasses along a transport path in a processing space; and B) feeding scalding medium to a plurality of outlet openings directed toward the transport path, characterized in that at least one of the outlet openings is co-displaced over a dispensing path at a fixed distance from the poultry carcasses being moved along the transport path. The advantages as already described above in respect of the device according to the present invention can be obtained by means of this method, such as in particular realizing a different scalding result for different parts of a poultry carcass. This means a controlled scalding result, wherein individual carcass parts of a single carcass can be scalded to varying degree in controlled manner.

As also already described in respect of the device according to the invention, the speed of an outlet opening following a dispensing path corresponds to the speed of a poultry carcass displaced along the transport path. This can be realized in simple manner for instance if the outlet opening co-displacing with the poultry carcass being moved along the transport path co-displaces with the poultry carcass while passing through a bend in the transport path. The outlet opening(s) co-displacing with the carcass will be directed particularly at carcass parts requiring more intensive scalding than other carcass parts. Examples of such carcass parts are: the neck, the wings, the legs and/or the tail of poultry carcasses. For the best possible scalding of these and other carcass parts it is advantageous if the position of the outlet opening co-displacing with the poultry carcass along the transport path is adjusted subject to the poultry for processing.

It is also possible for the outlet opening co-displacing with the poultry carcass along the transport path to be employed for feeding a less intensively acting scalding medium than a scalding medium acting on other parts of the poultry carcass. A more intensive scalding action is thus not realized locally but, on the contrary, a reduced scalding action is obtained locally.

The invention moreover provides a method for scalding poultry carcasses having plumage, wherein cover members are also co-displaced over a part of the transport path with the poultry carcasses being moved along the transport path, whereby parts of the poultry carcasses are shielded such that they undergo a less intensive scalding process than the parts of the poultry carcasses not shielded by the cover members. A reduced scalding action can also be obtained locally in this way. By means of the method the advantages already described above in respect of the method with co-displacing outlet openings can be realized. This alternative method can be seen as a kinematic reversal of the embodiment variant with the co-displacing outlet openings.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 1:
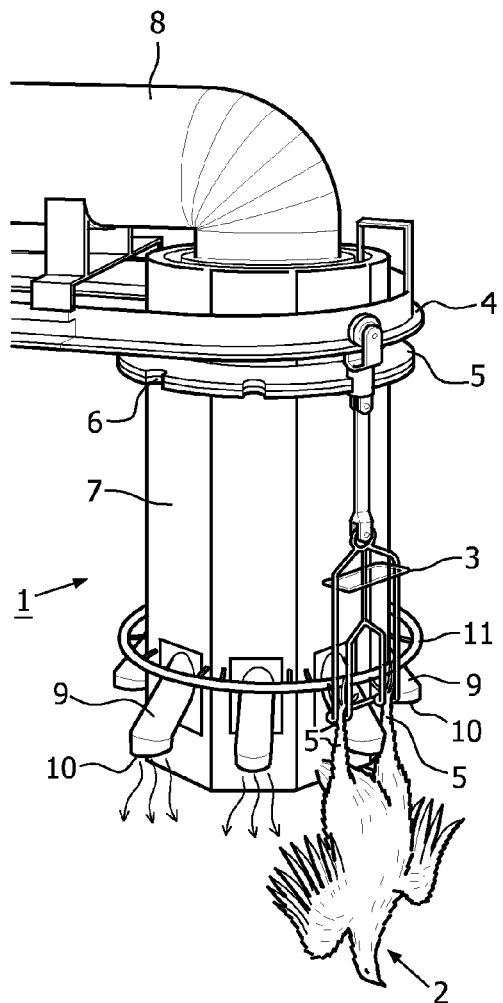
FIG. 1 is a perspective view of a part of a device for scalding poultry carcasses comprising a plumage according to the present invention.

FIG. 1 shows a part of a processing space 1 in which a poultry carcass 2 is suspended from a transport path 4 by means of a holder 3. Poultry carcass 2 is suspended upside down from legs 5 in holder 3. In the shown part the transport path 4 is passing through a bend, wherein a reversing wheel 5 with recesses 6 carries along the holder 3 (of which only one is shown in this figure for the sake of simplicity). An air drum 7 is connected to reversing wheel 5, to which air drum 7 a scalding medium can be fed through a feed pipe 8. Tubes 9 with outlet openings 10 connect to the interior of air drum 8 such that the scalding medium fed through feed pipe 8 flows out of tubes 9 at outlet openings 10. This outflow of the scalding medium is indicated schematically by means of arrows $P_1$. As it passes through the bend the poultry carcass 2 will thus be treated with a flow ($P_1$) of scalding medium directed toward the cloaca and the tail. Poultry carcass 2 can thus be scalded more intensively at the position of these carcass parts (the cloaca and the tail) than the other carcass parts. For an accurate positioning of poultry carcass 2 relative to an outlet opening 10 of a tube 9, air drum 8 is provided with a leg and holder guide 11.

Figure 2:
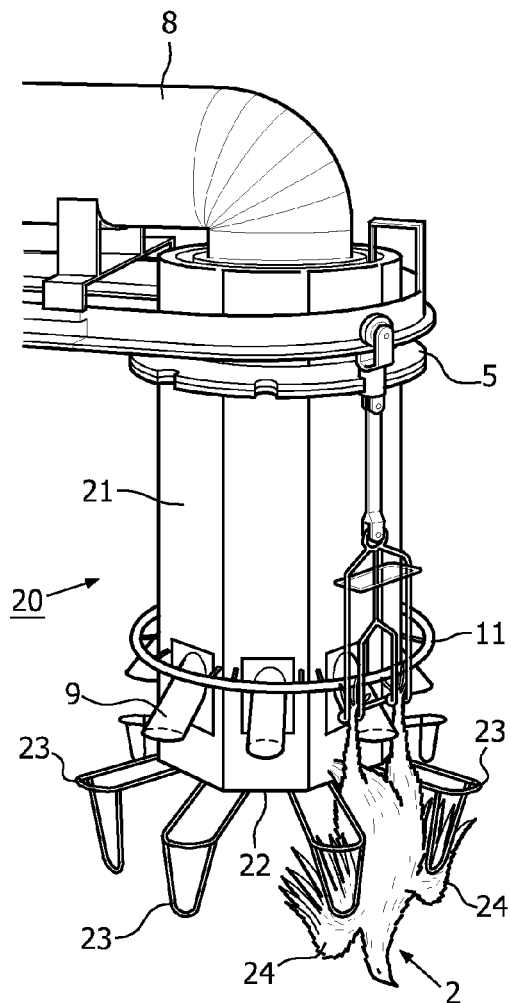
FIG. 2 is a perspective view of a part of an alternative embodiment variant of a device according to the invention.

FIG. 2 shows a part of a processing space 20 greatly resembling that already shown in FIG. 1. Identical components are therefore designated with corresponding reference numerals. At variance with air drum 7 as shown in FIG. 1, the air drum 21 shown here is provided on the underside 22 with additional spreaders 23, with which wings 24 of poultry carcass 2 can be urged into a moved-apart position. The great accuracy of the positioning of poultry carcass 2 enhances the controllability of the scalding process.

FIGS. 3A-3D likewise show parts of respective processing spaces 30, 40, 50, 60, which again closely resemble that already shown in FIGS. 1 and 2. Identical components are therefore once again designated with corresponding reference numerals.

Figure 3A:
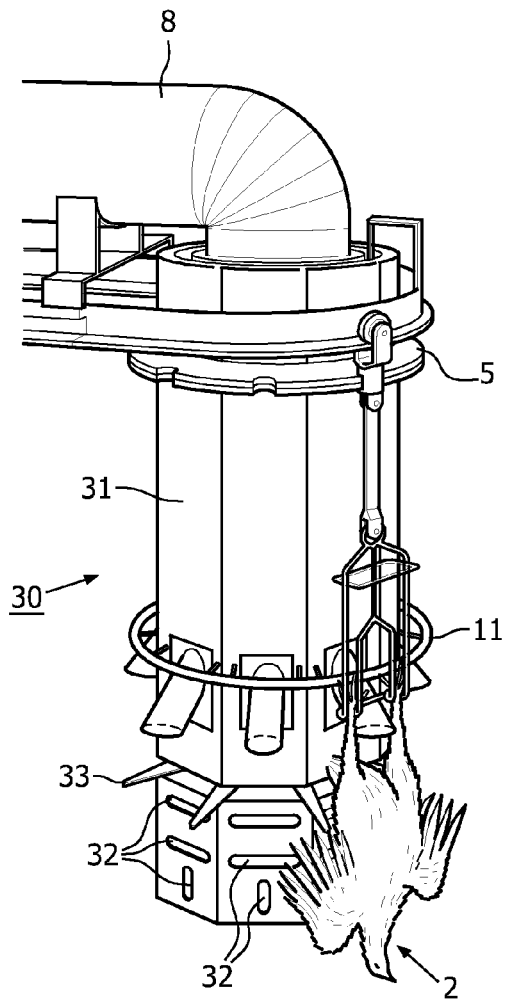
FIGS. 3A-3D each show a perspective view of a part of four other alternative embodiment variants of devices according to the invention.

At variance with what has already been shown, in FIG. 3A the air drum 31 is additionally provided with a number of outlet openings 32 which lie in line with air drum 31 and with which poultry carcass 2 can also be scalded intensively on the back side as reversing wheel 5 passes through the bend. It is noted that poultry carcass 2 can also be fed with its belly side toward air drum 31 ("belly feed") such that, instead of the back side, it is precisely the belly side of carcass 2 which can be scalded more intensively with outlet openings 32. Protruding separating elements 33 are further provided with which a further controlled orientation of poultry carcass 2 can be ensured.

Figure 3B:
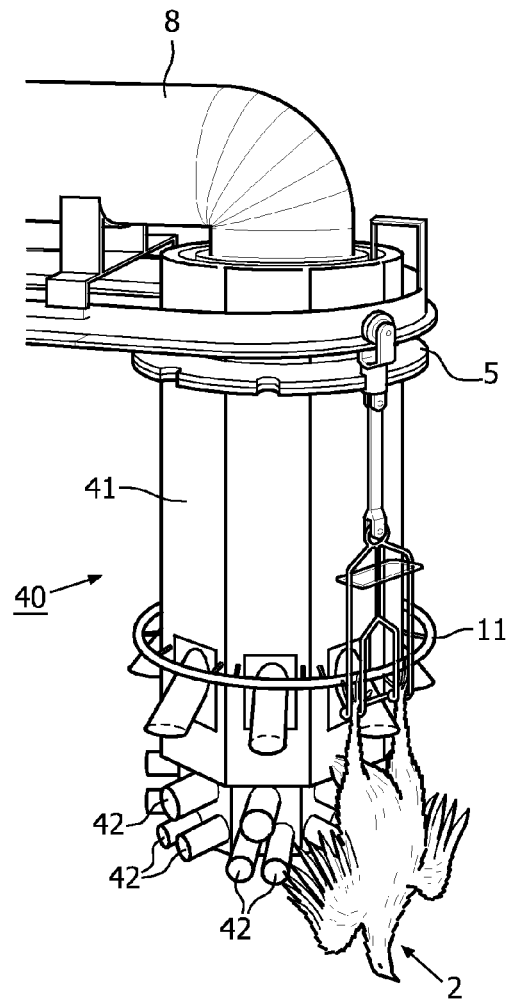

At variance with what has already been shown, in FIG. 3B air drum 41 is provided with a number of blow pipes 42 situated on the underside of air drum 41. Such blow pipes 42 can for instance also be effectively embodied such that they are displaceable so as to thus enable optimal positioning thereof subject to the dimensioning of a determined batch of poultry carcasses 2.

Figure 3C:
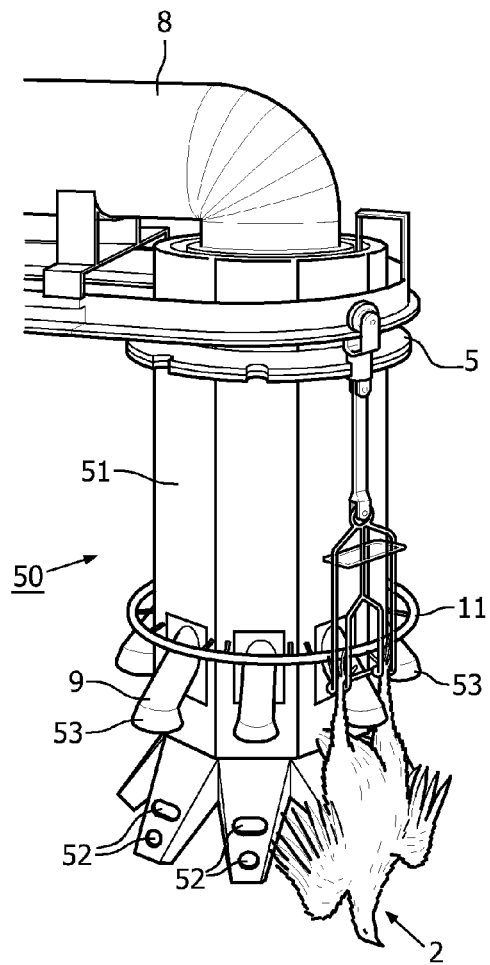
Figure 3D:
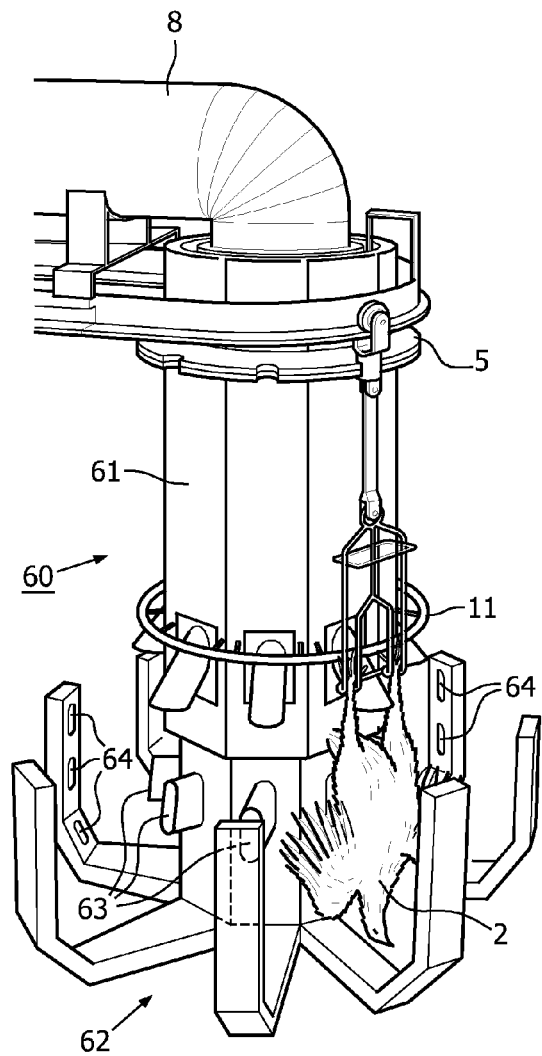

FIG. 3C also shows a differing air drum 51, this time with a number of outlet openings 52 directed obliquely upward. Tubes 9 are this time also provided with outlet openings 53 which differ from the above shown outlet openings 10. Air drum 61 as shown in FIG. 3D is provided with a star-shaped extension 62 which engages round poultry carcass 2 such that respective outlet openings 63 and 64 can blow intensively onto both the belly side and the back side of poultry carcass 2.

Figure 4A:
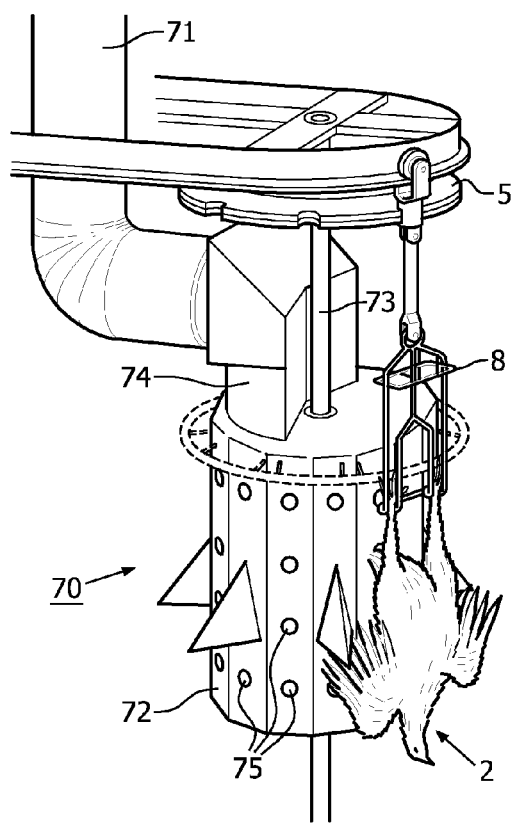
FIGS. 4A and 4B likewise show perspective views of a part of another two alternative embodiment variants of devices according to the invention.
Figure 4B:
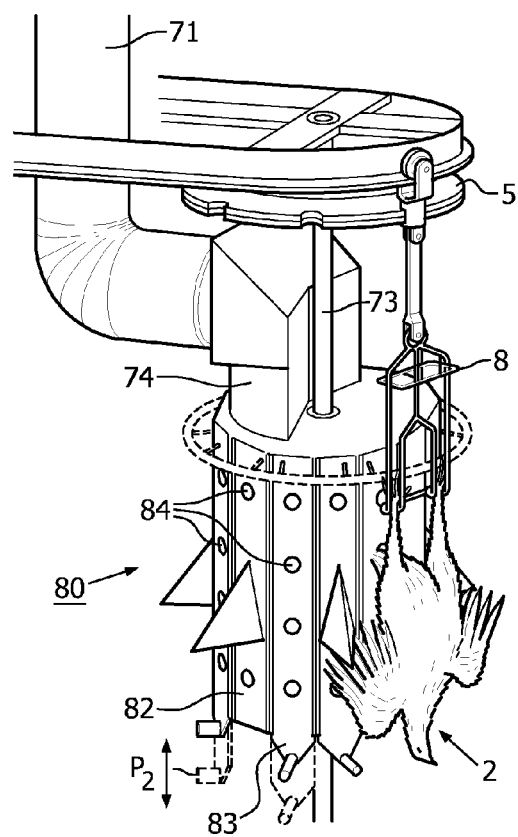

FIGS. 4A and 4B also show parts of respective processing spaces 70 and 80 which are less similar to the foregoing figures, although identical parts are here yet again designated with the same reference numerals. Both figures show a feed 71 for scalding medium which connects to respective air drums 72, 82. These air drums 72 and 82 are now located some distance from reversing wheel 5, but coupled thereto for fixed rotation via shaft 73. Feed 71 for scalding medium connects sealingly to air drums 72 and 82 via a coupling part 74 such that these drums can rotate while coupling part 74 remains fixed in the shown position. Air drum 72 of FIG. 4A is provided with a plurality of fixedly positioned outlet openings 75 which lie one above another and which can blow onto the poultry carcass over a greater length. Wing spreaders 76 are also arranged on air drum 72 for holding wing 24 of poultry carcass 2 in a desired orientation. Air drum 82 of FIG. 4B closely resembles air drum 72 as shown in FIG. 4A, although air drum 82 is provided with vertically displaceable air drum segments 83 which are displaceable as according to arrow $P_2$ such that the position of outlet openings 84 can hereby be changed. An optimal setting of outlet openings 84 can thus be adjusted per batch of poultry carcasses 2 or even per individual poultry carcass 2.

Figure 5A:
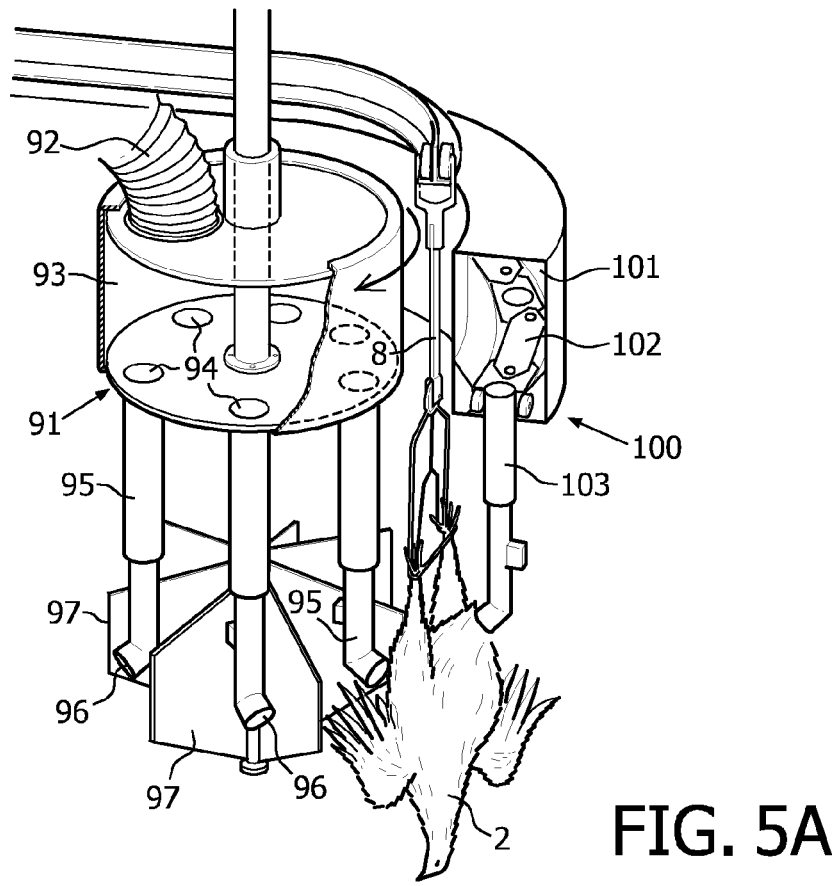
FIGS. 5A and 5B show partially cut-away perspective views of two further alternative embodiment variants of the device according to the invention.

Yet another embodiment variant of an air drum 91 is shown in FIG. 5A. Clearly visible in FIG. 5A is that a feed pipe 92 for scalding medium connects to a distribution chamber 93, from where the scalding medium flows into channels 94. Channels 94 connect to height-adjustable tubes 95 with outflow openings 96. Air drum 91 is subdivided by means of partitions 97 into different compartments or cabinets in which poultry carcasses 2 can be received. As additional innovation relative to the foregoing, FIG. 5A shows that a dispensing conveyor 100 co-displacing with transport path 4 is also provided on the outside of air drum 91. Scalding medium is fed through a closed channel 101, and a second dispensing conveyor 102, this time embodied in the form of a chain, is also arranged in this channel 101, with which height-adjustable dispensing pipes 103 can be co-displaced with poultry carcasses 2 on the outside of the bend defined by air drum 91.

Figure 5B:
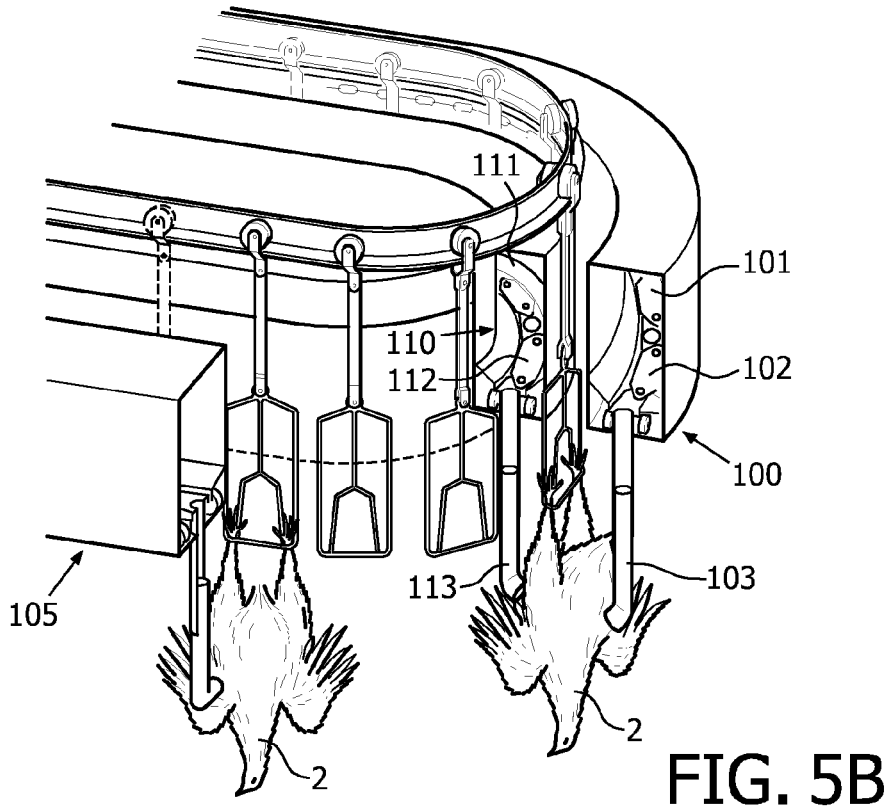

The dispensing conveyor 100 co-displacing with transport path 4 is also shown in FIG. 5B, although here, instead of with air drum 91, also with a similar co-displacing dispensing conveyor 110 in the inside bend. Scalding medium is here also fed through a closed channel 111. Likewise arranged in channel 111 is a dispensing conveyor 112 embodied in the form of a chain with which height-adjustable dispensing pipes 113 can be co-displaced with poultry carcasses 2 on the outside of the bend. It is noted that dispensing conveyors 100 and 110 need not of course be applied only in a bend; this is also shown by means of linear segment 105 which forms part of dispensing conveyor 100.

Figure 6:
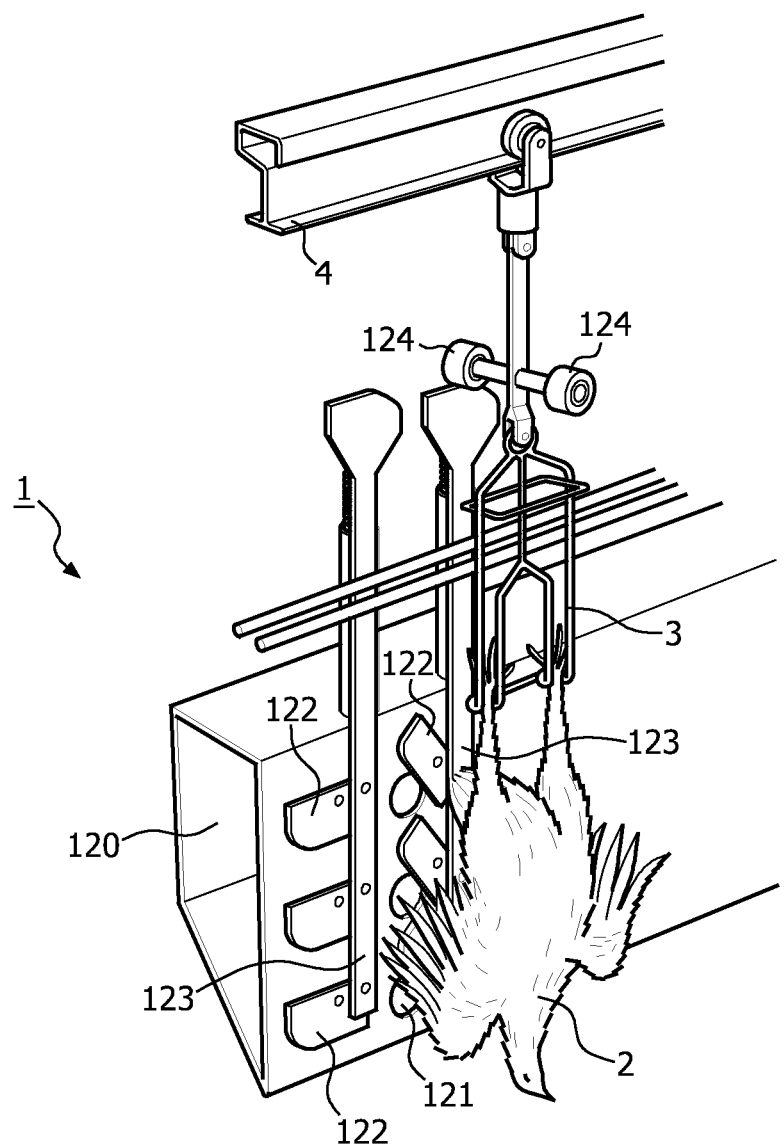
FIG. 6 is a perspective view of a part of yet another embodiment variant of a device according to the present invention with fixed nozzles.

FIG. 6 shows a part of a processing space 1 in which a poultry carcass 2 is suspended from a transport path 4 by means of a holder 3. Poultry carcass 2 is here carried along a channel 120 through which a scalding medium is supplied. Outlet openings 121, which can be closed in controllable manner with valves 122, are arranged in scalding medium channel 120. For this purpose valves 122 form part of a rod mechanism, of which a vertical control rod 123 also forms part. It is also possible to envisage various alternatives to the shown valves 122, such as for instance a diaphragm construction which also has the advantage that the size of the opening can thereby also be adjusted. By pressing vertical control rod 123 the valves 122 connected to the relevant vertical control rod 123 are pivoted upward such that outlet openings 121 are thereby opened. The figure also clearly illustrates that holder 3 from which poultry carcass 2 is suspended is provided with two control cams 124. By moving holder 3 along transport path 4 the outlet openings 121 will thus always be opened at the position where poultry carcass 2 is situated. When a vertical control rod 123 is released by control cams 124, it will be moved upward again due to a bias such that the outlet openings 123 operated by the relevant control rod are closed again. In this way a jet of scalding medium will always occur at the position where poultry carcass 2 is situated; alternatively, a situation is thus created whereby a jet of scalding medium virtually co-displaces with poultry carcass 2.

Figure 7:
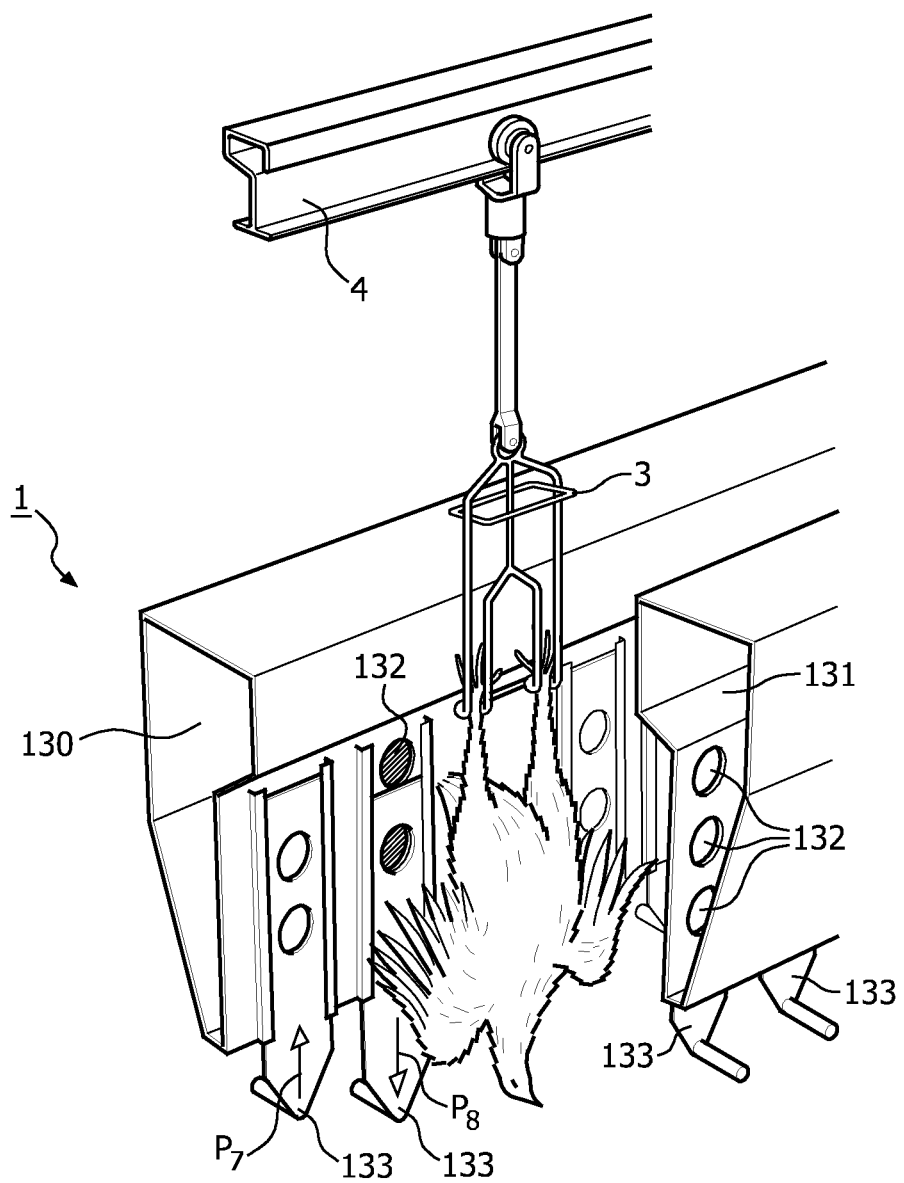
FIG. 7 is a perspective view of a part of yet another embodiment variant of a device according to the present invention with fixed nozzles, which somewhat resembles the device as shown in FIG. 6.

FIG. 7 once again shows a processing space 1 in which a poultry carcass 2 is suspended from a transport path 4 by means of a holder 3. Poultry carcass 2 is now however carried between two channels 130, 131, through both of which a scalding medium is fed. Arranged in both scalding medium channels 130, 131 are outlet openings 132 which can be closed in controlled manner with vertically displaceable slides 133. Outlet openings 132 are opened and closed by operating slides 133 in controlled manner (see arrows $P_7$ and $P_8$). Other than in FIG. 6, the slides are not controlled by holder 3 but by a specific control mechanism which is not shown in this figure. In the construction shown in FIG. 7 outlet openings 132 are however also opened only at the position of poultry carcass 2. A jet of scalding medium also always results at the position were poultry carcass 2 is situated by means of operating slides 133; whereby a situation is here also created in which a number of jets of scalding medium lying one above another virtually co-displace with poultry carcass 2.

Figure 8:
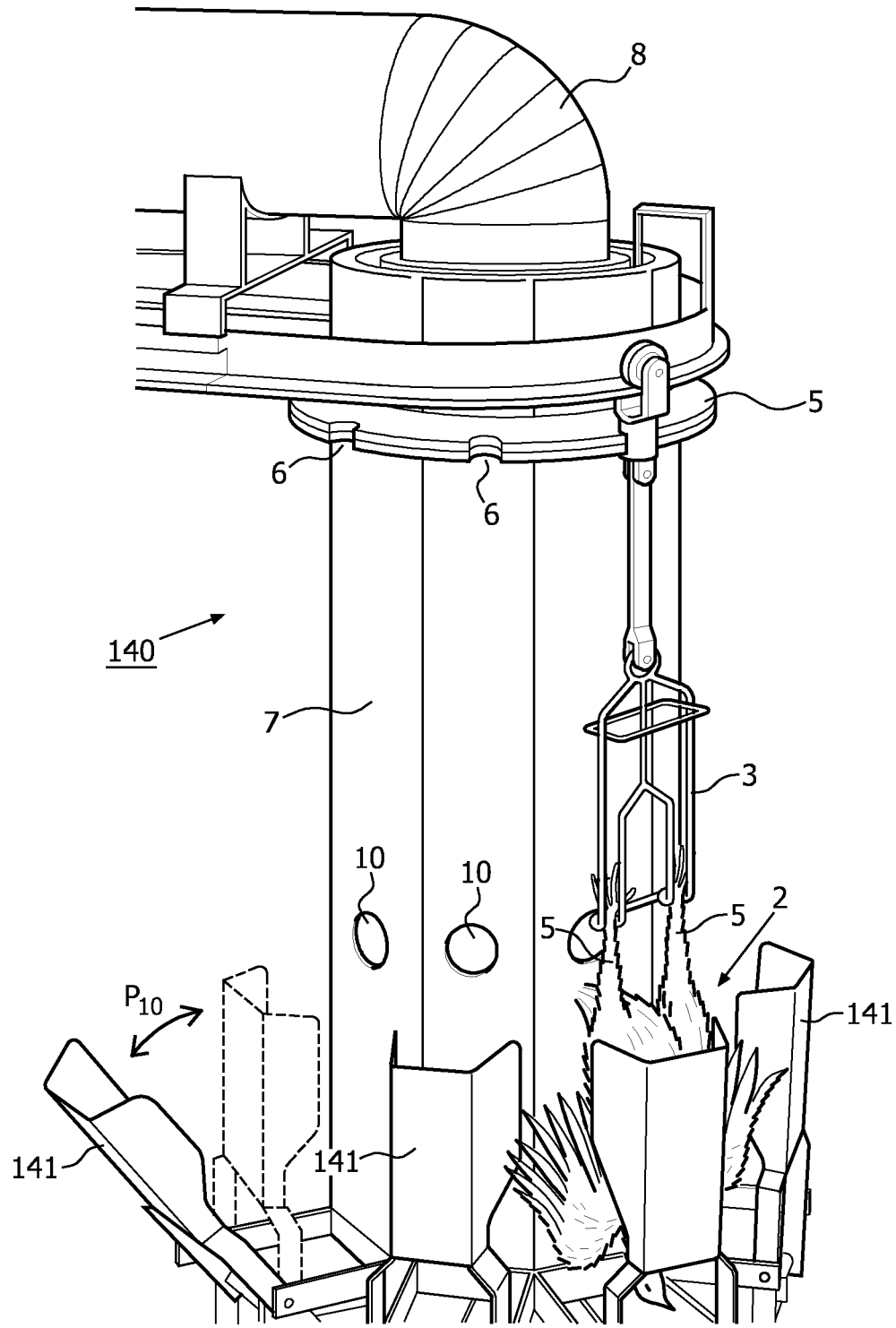
FIG. 8 shows a completely different embodiment variant of a device according to the invention, in which not only a jet of scalding medium co-displaces with a poultry carcass, but in which a part of the carcasses is also shielded from intensive scalding.

FIG. 8 shows a part of a device 140, again with a part of a processing space 1 in which a poultry carcass 2 is suspended from a transport path 4 by means of a holder 3. Poultry carcass 2 is suspended upside down from legs 5 in holder 3. Referring to for instance FIG. 1, it can also be seen here that transport path 4 passes through a bend in the shown part, wherein a reversing wheel 5 with recesses 6 displaces holder 3 (only one of which is shown in this figure for the sake of simplicity). An air drum 7 is connected to reversing wheel 5, to which air drum 7 a scalding medium can be fed through a feed pipe 8. Situated on the inside of air drum 8 are outlet openings 10, through which the scalding medium fed through feed pipe 8 flows outside at outlet openings 10. While passing through the bend, the poultry carcass 2 will thus be treated with a flow of scalding medium directed toward the cloaca and the tail. Poultry carcass 2 can thus be scalded more intensively at the position of these carcass parts (the cloaca and the tail) than the other carcass parts. Up to this point device 140 is more or less known from the above described figures. In addition however, this device 140 also has shielding covers 141 with which the breasts of poultry carcasses 2 can be shielded (protected) against excess scalding. Process conditions can thus be created in processing space 1 such that all non-shielded carcass parts are scalded more intensively than the carcass parts which are shielded, such as for instance by means of shielding covers 142. These shielding covers 141 open and close (see arrow $P_{10}$) at respectively the entry to and exit from the transport path provided by reversing wheel 5. The shielding of parts of poultry carcasses 2 can of course also take place without the co-displacing outlet openings 10 through which the scalding medium is fed.

The invention claimed is:

1. A device for scalding poultry carcasses comprising a plumage, comprising:
    a processing space provided with transport means which define a transport path for the poultry carcasses leading through the processing space;
    a feed of scalding medium; and
    dispensing means for the scalding medium connecting the feed of scalding medium to the processing space and provided with a plurality of outlet openings which are directed toward the transport path and with which the scalding medium is carried into the transport path,
    wherein the dispensing means can be controlled such that the scalding medium leaving the outlet openings co-displaces with the poultry carcasses moving along the transport path.

2. The device as claimed in claim 1, wherein the dispensing means comprise at least one displaceable outlet opening which is carried by a dispensing conveyor, which dispensing conveyor is movable along a dispensing path, wherein the dispensing path lies at a fixed distance from the transport path over at least a part of the transport path for the poultry carcasses followed by the transport means.

3. The device as claimed in claim 2, wherein the relative position of the dispensing conveyor and the displaceable outlet opening carried thereby is adjustable.

4. The device as claimed in claim 2, wherein the dispensing conveyor also carries movable positioning means for positioning carcass parts of poultry carcasses carried by the transport means.

5. The device as claimed in claim 1, wherein the dispensing means are provided with valves which can be controlled such that the outlet openings directed toward the transport path can be opened and closed as desired.

6. The device as claimed in claim 1, wherein the dispensing means are adapted such that the resistance of the feed of scalding medium to the individual outlet openings can be controlled per outlet opening.

7. The device as claimed in claim 1, wherein the feed of scalding medium takes a multiple form such that different outlet openings of the dispensing means can be fed with different scalding media.

8. The device as claimed in claim 1, wherein the dispensing means are embodied such that the speed at which the scalding medium is carried out of the different outlet openings differs.

9. The device as claimed in claim 1, wherein the device comprises positioning means disposed in stationary manner in the processing space for positioning carcass parts of poultry carcasses carried by the transport means.

10. The device as claimed in claim 1, wherein the feed of scalding medium comprises a conditioning space for composing a scalding medium.

11. The device as claimed in claim 1, wherein the dispensing means also comprise at least one outlet opening arranged in stationary manner.

12. The device as claimed in claim 1, wherein the device is provided with at least one sensor and an intelligent control communicating with the sensor.

13. A method for scalding poultry carcasses comprising a plumage, comprising the processing steps of:

A) displacing the poultry carcasses along a transport path in a processing space; and B) feeding scalding medium to a plurality of outlet openings directed toward the transport path, wherein at least one of the outlet openings is moved over a dispensing path at a fixed distance from the poultry carcasses being displaced along the transport path.

14. The method as claimed in claim 13, wherein the speed of an outlet opening co-displacing with the poultry carcass being moved along the transport path substantially corresponds to the transport speed of the poultry carcass.

15. The method as claimed in claim 13, wherein the position of the outlet opening co-displacing with the poultry carcass along the transport path is adjusted subject to the poultry for processing.

16. The method as claimed in claim 13, wherein the outlet opening co-displacing with the poultry carcass along the transport path is employed for feeding a less intensively acting scalding medium than a scalding medium acting on other parts of the poultry carcass.

* * * * *

UNITED STATES PATENT AND TRADEMARK OFFICE
CERTIFICATE OF CORRECTION

PATENT NO. : 8,496,513 B2
APPLICATION NO. : 13/130635
DATED : July 30, 2013
INVENTOR(S) : Van Esbroeck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 252 days.

Signed and Sealed this
Fifteenth Day of September, 2015

Michelle K. Lee
*Director of the United States Patent and Trademark Office*